US010177798B2

(12) United States Patent
Zhao et al.

(10) Patent No.: US 10,177,798 B2
(45) Date of Patent: Jan. 8, 2019

(54) ELECTRONIC APPARATUS AND ANTENNA SETTING METHOD FOR ELECTRONIC APPARATUS

(71) Applicant: GOERTEK INC., Weifang, Shangdong (CN)

(72) Inventors: Peijie Zhao, Weifang (CN); Degang Zhao, Weifang (CN); Hongyi Zhang, Weifang (CN); Lin Wang, Weifang (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 15/578,241

(22) PCT Filed: May 24, 2016

(86) PCT No.: PCT/CN2016/083087
§ 371 (c)(1),
(2) Date: Nov. 29, 2017

(87) PCT Pub. No.: WO2016/192548
PCT Pub. Date: Dec. 8, 2016

(65) Prior Publication Data
US 2018/0152214 A1 May 31, 2018

(30) Foreign Application Priority Data
Jun. 3, 2015 (CN) .......................... 2015 1 0300382

(51) Int. Cl.
*H04B 1/38* (2015.01)
*H04B 1/3827* (2015.01)
(Continued)

(52) U.S. Cl.
CPC ............. *H04B 1/385* (2013.01); *G04R 60/06* (2013.01); *H01Q 1/273* (2013.01); *H04B 1/401* (2013.01);
(Continued)

(58) Field of Classification Search
CPC ........ H04B 1/385; H04B 1/401; H01Q 1/273; H01Q 1/38
(Continued)

(56) References Cited

U.S. PATENT DOCUMENTS 6,278,864 B1 * 8/2001 Cummins ................ H04B 1/38
455/73
8,610,629 B2 12/2013 Pascolini et al.
(Continued)

FOREIGN PATENT DOCUMENTS

CN 101466214 A 6/2009
CN 102142855 A 8/2011
(Continued)

OTHER PUBLICATIONS

CN Office Action dated Apr. 5, 2017, in application No. 201510300382.4.
(Continued)

*Primary Examiner* — Eugene Yun
(74) *Attorney, Agent, or Firm* — Maschoff Brennan

(57) ABSTRACT

The present invention discloses an electronic apparatus and an antenna setting method for electronic apparatus, wherein the electronic apparatus comprises a metal appearance surface; the metal appearance surface consists of a plurality of mutually separated metal pieces; an insulating piece is provided between the two adjacent metal pieces; each metal piece is provided thereon with one or more antennas, each antenna is connected with a communication module on a master chip of the electronic apparatus. The technical proposal provided by the present invention provides a solution for a multi-frequency antenna for an electronic apparatus having a metal appearance surface, the metal appearance surface of the electronic apparatus is divided into a plurality of metal pieces, these metal pieces are used directly to
(Continued)

achieve multi-antennas, effectively utilizing the physical size of the metal pieces, solving the contradiction between an antenna body and the metal pieces in the antenna design in the prior art, reducing the design restriction of the metal pieces, achieving the visual effect that the metal appearance surface of the electronic apparatus maintains the unity, and realizing the design of the multi-frequency antenna without affecting the appearance surface integrity of the electronic apparatus.

14 Claims, 4 Drawing Sheets

(51) Int. Cl.
*H01Q 1/27* (2006.01)
*H04B 1/401* (2015.01)
*G04R 60/06* (2013.01)
*H01Q 1/38* (2006.01)
*H01Q 1/22* (2006.01)
*H01Q 21/30* (2006.01)
*H01Q 5/45* (2015.01)

(52) U.S. Cl.
CPC ............ *H01Q 1/2291* (2013.01); *H01Q 1/38* (2013.01); *H01Q 5/45* (2015.01); *H01Q 21/30* (2013.01); *H04B 2001/3855* (2013.01); *H04B 2001/3861* (2013.01)

(58) Field of Classification Search
USPC ...................................................... 455/90.2
See application file for complete search history.

(56) References Cited

U.S. PATENT DOCUMENTS

| | | |
|---|---|---|
| 2008/0025152 A1 | 1/2008 | Yano et al. |
| 2012/0214425 A1* | 8/2012 | Huang .................... H01Q 1/36 455/73 |
| 2016/0093941 A1* | 3/2016 | Hsu ........................ H01Q 1/243 455/575.7 |
| 2016/0313700 A1* | 10/2016 | Fraser .................. G04B 37/084 |

FOREIGN PATENT DOCUMENTS

| | | |
|---|---|---|
| CN | 104934693 A | 9/2015 |
| CN | 104953278 A | 9/2015 |
| CN | 204793174 U | 11/2015 |

OTHER PUBLICATIONS

CN Office Action dated Nov. 16, 2017 as received in Application No. 201510300382.4.

* cited by examiner

ELECTRONIC APPARATUS AND ANTENNA SETTING METHOD FOR ELECTRONIC APPARATUS

CROSS REFERENCE TO RELATED APPLICATIONS

This application is national phase application of PCT international application No. PCT/CN2016/083087, filed May 24, 2016, which claims priority to Chinese Patent Application No. 201510300382.4, filed Jun. 3, 2015. The entire contents of these applications are incorporated herein by reference.

TECHNICAL FIELD OF THE INVENTION

The present invention relates to the field of communication, and more particular to an electronic apparatus and an antenna setting method for electronic apparatus.

BACKGROUND OF THE INVENTION

There are many antenna body designs of an electronic apparatus in the prior art, for example, a Flexible Printed Circuit (FPC) board is attached to other components to form an antenna body, or a section of sheet metal is fixed to a plastic housing through a heat stake to form the antenna body; the antenna body and the metal component need to have a certain distance therebetween to ensure radiation efficiency. When the electronic apparatus uses the metal housing (or mostly uses the metal housing), the antenna design in the prior art will have two problems:

First, because the metal component needs be avoided as far as possible when an antenna is designed, and the radiation space of the antenna shall be realized through a non-metallic surface as possible, this tends to limit the antenna design space, and it is difficult to achieve good antenna efficiency. Second, because the dyeing processes of the metal component and a non-metallic component are not the same, it is difficult to maintain a consistent color and luster. Therefore, the appearance design of electronic apparatus, especially the design of the metal component, is limited, and in the outline of a product, aesthetics will be affected because of the chromatic aberration of the metal component and the non-metallic component.

SUMMARY OF THE PRESENT INVENTION

In view of the above problems, the present invention provides an electronic apparatus and an antenna setting method for the electronic apparatus to solve the above-mentioned problems or at least partially solve the above-mentioned problems.

According to an aspect of the present invention, there is provided an electronic apparatus including a metal made appearance surface;

the metal appearance surface consists of a plurality of mutually separated metal pieces;

an insulating piece is provided between two adjacent metal pieces;

each metal piece is provided thereon with one or more antennas, and each antenna is connected with a communication module on a master chip of the electronic apparatus.

Optionally, the electronic apparatus further includes a plastic base for mounting and fixing the metal appearance surface;

a partitioning plastic piece is provided on the plastic base; when the metal appearance surface is mounted on the plastic base, the partitioning plastic piece is embedded between the adjacent two metal pieces as the insulating piece.

Optionally, the width of the partitioning plastic piece is smaller than a width threshold, and the partitioning plastic piece and the plastic base use the same type of injection molding plastic.

Optionally, for the a plurality of the metal pieces, the antennas provided on the different metal pieces support different communication bands and/or communication types, respectively;

the communication module includes a plurality of radio frequency transceiver modules, each radio frequency transceiver module supports a communication frequency band and/or a communication type;

the a plurality of the radio frequency transceiver modules are adapted to the antennas provided on the a plurality of the metal pieces, respectively.

Optionally, the electronic apparatus is a smart watch;

the metal appearance surface is a metal made upper watch casing;

the upper watch casing is divided into two symmetrical metal pieces.

Optionally, the electronic device further includes a watch band;

the upper watch casing is divided into two metal pieces which are symmetrical in a direction parallel to a watch spindle;

the two metal pieces and the two ends of the watch band are assembled by the watch spindle, respectively.

Optionally, each metal piece, through a connection device, is elastically connected with the communication module on the master chip in the smart watch, so that the corresponding antenna is connected with the communication module;

the communication module is provided on the printed circuit board (PCB) of the master chip, the PCB is provided thereon with an antenna contact position;

the connection device includes a bi-directional pogo pin, a unidirectional pogo pin and a metal clip;

when the connection device is the bi-directional pogo pin, one end of the bi-directional pogo pin is in contact with the metal piece, and the other end of the bi-directional pogo pin is positioned in the antenna contact position; when the connection device is the unidirectional pogo pin or the metal clip, one end of the unidirectional pogo pin or the metal clip is in contact with the metal piece, and the other end of the unidirectional pogo pin or the metal clip is welded in the antenna contact position.

Optionally, the surfaces of each metal contact portion on the a plurality of the metal pieces for achieving the connection with the communication module is plated with gold; the metal pieces are made of different synthetic metal components.

Optionally, the a plurality of the metal pieces uses different processing manners of the metal appearance surface.

According to another aspect of the present invention, there is provided an antenna setting method of an electronic apparatus, the method including:

dividing a metal appearance surface of the electronic apparatus into a plurality of mutually separated metal pieces;

providing an insulating piece between the two adjacent metal pieces;

providing one or more antennas on each metal piece, and connecting each antenna with a communication module on a master chip of the electronic apparatus.

Optionally, the method further includes mounting and fixing the metal appearance surface of the electronic apparatus on the plastic base;

providing a partitioning plastic piece on the plastic base;

when the metal appearance surface is mounted on the plastic base, the partitioning plastic piece being embedded between the adjacent two metal pieces as the insulating piece.

Optionally, for the a plurality of the metal pieces, the antennas provided on the different metal pieces is set as the antennas supporting different communication bands and/or communication types, respectively;

the communication module includes a plurality of radio frequency transceiver modules, each radio frequency transceiver module supporting a communication frequency band and/or a communication type; and the a plurality of the radio frequency transceiver modules are adapted to the antennas provided on a plurality of the metal pieces, respectively.

Optionally, the electronic apparatus is a smart watch;

the metal made upper watch casing of the smart watch is taken as the metal appearance surface of the electronic apparatus; and dividing the metal appearance surface of the electronic apparatus into a plurality of mutually separated metal pieces includes dividing the upper watch casing into two symmetrical metal pieces.

Optionally, dividing the upper watch casing into two symmetrical metal pieces specifically includes dividing the upper watch casing into two metal pieces which are symmetrical in a direction parallel to a watch spindle;

The smart watch further includes a watch band, and the method further includes assembling the two metal pieces and the two ends of the watch band via the watch spindle.

Optionally, connecting each antenna on the metal piece with the communication module includes elastically connecting each metal piece with the communication module on the master chip in the smart watch through a connection device, so that the corresponding antenna is connected with the communication module;

the communication module is provided on the Printed Circuit Board (PCB) of the master chip, the PCB is provided thereon with an antenna contact position;

the connection device includes a bi-directional pogo pin, a unidirectional pogo pin and a metal clip;

when the connection device is the bi-directional pogo pin, one end of the bi-directional pogo pin is contact with the metal piece, and the other end of the bi-directional pogo pin is positioned in the antenna contact position; when the connection device is the unidirectional pogo pin or the metal clip, one end of the unidirectional pogo pin or the metal clip is in contact with the metal piece, and the other end of the unidirectional pogo pin or the metal clip is welded in the antenna contact position.

Optionally, the surfaces of each metal contact portion on the a plurality of the metal pieces for achieving the connection with the communication module are plated with gold; the metal piece is made of different synthetic metal components.

As can be seen from the above, the technical solution provided by the present invention proposes a solution for a multi-frequency antenna for an electronic apparatus having a metal appearance surface; the solution divides the metal appearance surface of the electronic apparatus having visual completion into a plurality of metal pieces, and directly uses these metal pieces to realize the multi-antenna, effectively utilizing the physical size of the metal piece, solving the contradiction between the antenna body and the metal component in the antenna design in the prior art, thus reducing the design constraints on the metal component, improving the efficiency of the antenna, and making the electronic equipment have more texture and more strength; and since the metal pieces are isolated by an insulating piece, the metal appearance surface of the electronic apparatus may maintain an integrated visual effect, the multi-antenna radiator is formed on the basis of the overall appearance of the electronic apparatus without affecting the appearance of the electronic apparatus and the multi-frequency antenna design of the electronic apparatus is conveniently and effectively realized.

EMBODIMENTS OF THE PRESENT INVENTION

The objects, technical solution and advantages of the present invention will become more apparent from the following further detailed description of embodiments of the present invention in conjunction with the accompanying drawings.

Figure 1:
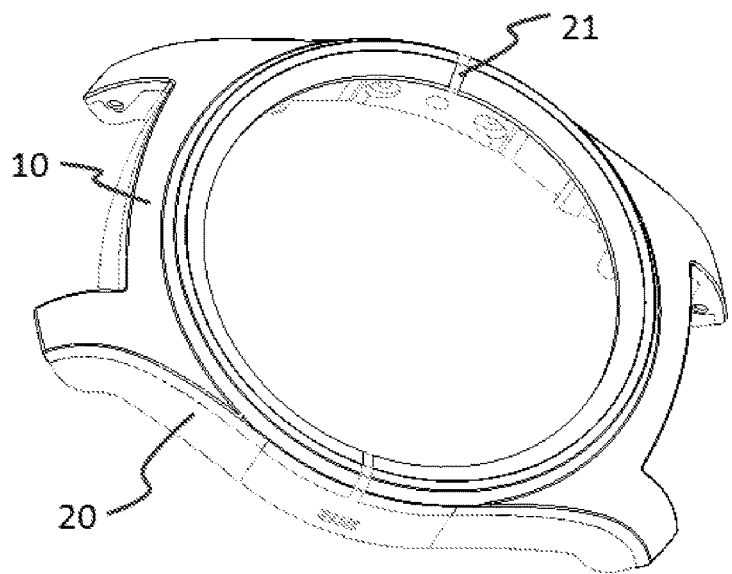
FIG. 1 shows a diagram of an electronic apparatus according to one embodiment of the present invention.
Figure 2:
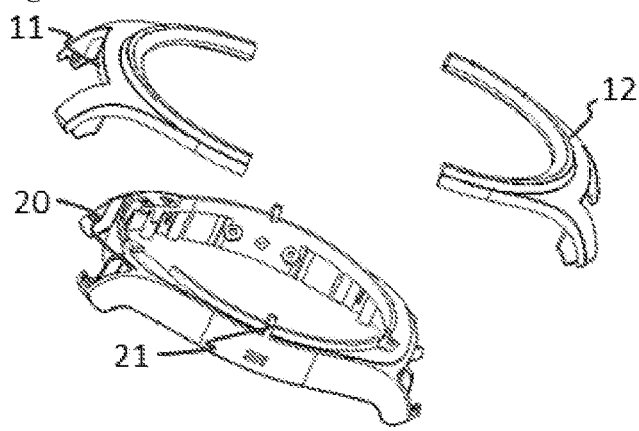
FIG. 2 shows an exploded view of an electronic apparatus according to one embodiment of the present invention.

FIG. 1 shows a diagram of an electronic apparatus according to one embodiment of the present invention, FIG. 2 shows an exploded view of an electronic apparatus according to one embodiment of the present invention, and the electronic apparatus shown in FIGS. 1 and 2 utilizes the metal appearance surface (or an outer surface) to achieve the design of a multi-frequency antenna. As shown in FIGS. 1, 2, in the embodiment, the electronic apparatus is a smart watch, the metal appearance surface of the smart watch includes a metal made upper watch casing, the smart watch includes the metal made upper watch casing 10 and a plastic base 20 for mounting and fixing the upper watch casing 10.

The metal upper casing 10 is divided into two symmetrical metal pieces: a metal piece 11 and a metal piece 12, and each metal piece is a single independent metal piece; two partitioning plastic pieces 21 are provided on the plastic base 20; when the upper watch casing 10 is mounted on the plastic base 20, the two partitioning plastic pieces 21 are embedded between the two adjacent surfaces of the metal piece 11 and the metal piece 12 as insulating piece, respectively, as shown in FIG. 1, the metal piece 11 and the metal piece 12 are separated by the partitioned plastic piece 21.

In one embodiment of the present invention, the metal made upper watch casing 10 and the plastic base 20 are integrally formed by an Insert-Molding process; the width of the partitioning plastic piece 21 is 0.6 mm-1 mm, and the partitioning plastic piece 21 and the plastic base 20 are made of the same injection molding plastic, this allows the upper watch casing 10 to be tightly combined with the plastic base 20, not only meeting the requirements of structural strength and water resistance, but also keeping the upper watch casing 10 of the smart watch in an integrated overall visual effect without affecting the appearance surface of the smart watch.

Figure 3:
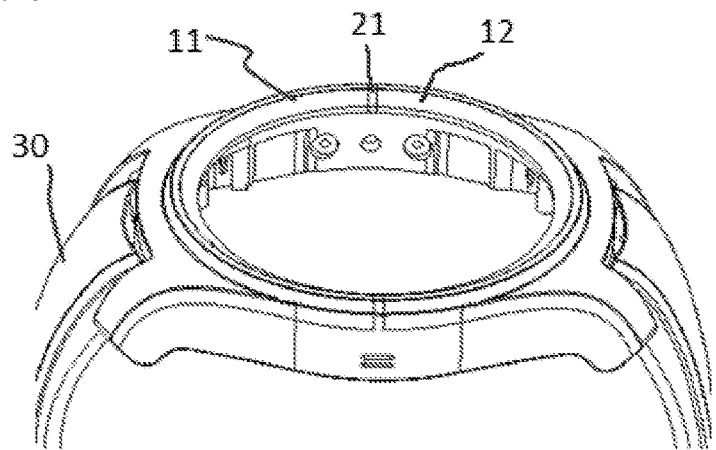
FIG. 3 shows a diagram of an electronic apparatus according to another embodiment of the present invention.

In one embodiment of the present invention, the smart watch further includes a watch band. FIG. 3 shows a diagram of an electronic apparatus according to another embodiment of the present invention, as shown in FIG. 3, the upper watch casing 10 is divided into two metal pieces which are symmetrical in the direction parallel to a watch spindle: the metal piece 11 and the metal piece 12, the metal piece 11 and one end of the watch band 30 are assembled through the watch spindle, and the metal piece 12 and the other end of the watch band 30 are also assembled through the watch spindle. For the implementation case where the upper watch casing 10 is divided into two metal piece 11 and the metal piece 12 which are symmetrical, considering a fixed manner and stability of the watch spindle, the dividing manner of the upper watch casing 10 and the arrangement manner of the partitioning plastic piece 21 shown in FIG. 3 are the most reasonable, and this manner means that the fixed position of the watch spindle is on a complete metal component (such as the metal piece 11 or the metal piece 12) rather than on different metal components, making it easier to achieve the desired accuracy of the fixing position of the mounted watch spindle.

Furthermore, in order to realize the design of the multi-frequency antenna of the smart watch, the smart watch also includes a communication module provided on a master chip, one or more antennas are provided on each metal piece in the upper watch casing 10, and each antenna is connected with the communication module on the master chip of the smart watch. The antennas provided on the different metal pieces support different communication bands and/or communication types, respectively, that is, multi-antennas support a plurality of communication signals, the communication bands of a plurality of the communication signals are all different and the communication types are the same, the communication bands of a plurality of the communication signals are all different and the communication types are the same, alternatively, or the communication bands and the communication types of a plurality of communication signals are all different, depending on the specific needs; the communication module includes a plurality of radio frequency transceiver modules, each radio frequency transceiver module supports a communication frequency band and/or a communication type; a plurality of the radio frequency transceiver modules are adapted to the antennas provided on a plurality of the metal pieces, respectively.

Figure 4:
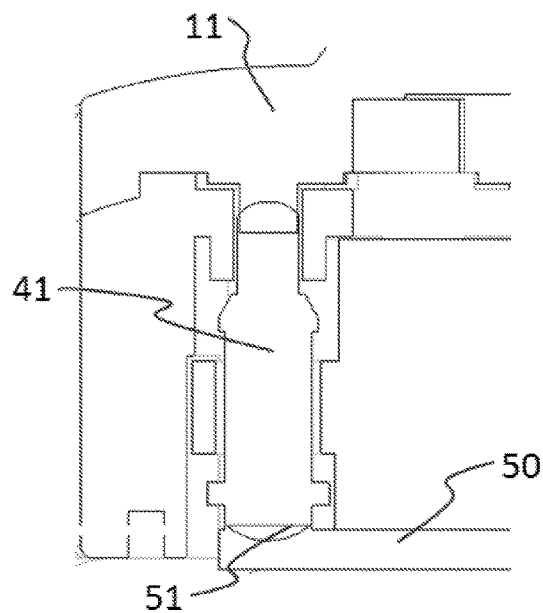
FIG. 4 shows a diagram of the connection of a metal piece according to one embodiment of the present invention.

In the embodiment, each metal piece is provided thereon with one antenna, specifically, the metal piece 11 and the metal piece 12 serve as two antennas for supporting different communication bands and/or communication types, respectively, the communication module includes two radio frequency transceiver modules, and each radio frequency transceiver module supports a communication frequency band and/or a communication type; the two radio frequency transceiver modules are adapted to the metal piece 11 and the metal piece 12, respectively. FIG. 4 shows a diagram of the connection of a metal piece according to one embodiment of the present invention. As shown in FIG. 4, the metal piece 11 is elastically connected with the communication module on the master chip in the smart watch through the bi-directional pogo pin 41, the communication module is provided on the printed circuit board (PCB) 50 of the master chip, the PCB 50 is provided thereon with an antenna contact position 51, one end of the bi-directional pogo pin 41 is in contact with the metal piece 11, and the other end of the bi-directional pogo pin 41 is placed in the antenna contact position 51, that is, the metal piece 11 is elastically connected with the corresponding antenna contact position 51 via the bi-directional pogo pin 41 to form one radio frequency path such that the metal piece 11 is connected with the radio frequency transceiver module adapted to the metal piece 11 in the communication module. The metal piece 12 is connected in the same manner as the metal piece 11, the metal piece 12 is elastically connected with the corresponding antenna contact position 51 via another bi-directional pogo pin 41 to form one radio frequency path such that the metal piece 12 is connected with the radio frequency transceiver module adapted to the metal piece 11 in the communication module. The reason why the elastic connection is carried out with the bi-directional pogo pin is as follows: when the elastic connection distance between the metal piece and the PCB is more than 2 mm, the metal clip in the prior art is difficult to be realized at the contact height; in the present embodiment, it is preferable to use a surface gold plating process to improve the contact effect at each metal contact portion.

Figure 5:
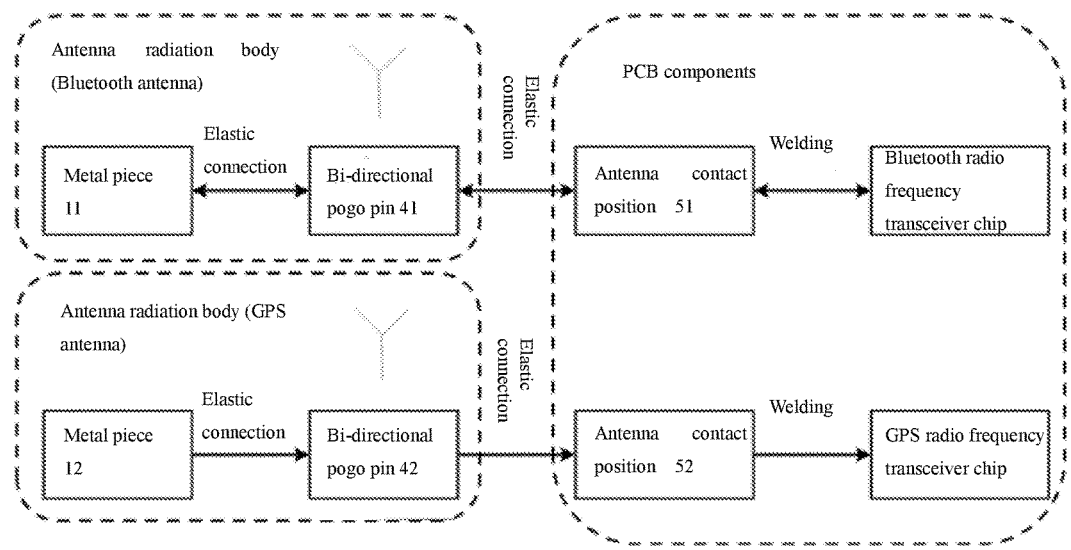
FIG. 5 shows a diagram of an antenna signal transceiver path according to one embodiment of the present invention.
Figure 6:
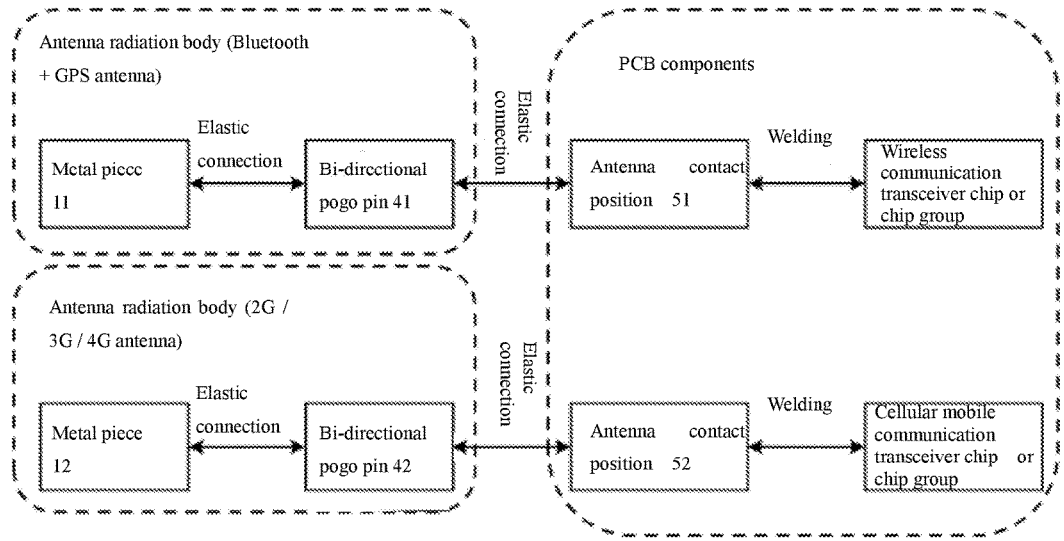
FIG. 6 shows a diagram of an antenna signal transceiver path according to another embodiment of the present invention.

As can be seen from the above, the metal piece and the communication module are connected therebetween, two antenna signal transceiver paths are formed in the smart watch, and the smart watch may send and receive signals for different communication bands and/or communication types through the two antenna signal transceiver paths. FIG. 5 shows a diagram of an antenna signal transceiver path according to one embodiment of the present invention; FIG. 6 shows a diagram of an antenna signal transceiver path according to another embodiment of the present invention. As shown in FIG. 5, the metal piece 11, the bi-directional pogo pin 41, the antenna contact position 51 and the Bluetooth radio frequency transceiver chip form a Bluetooth signal transceiver path; the metal piece 12, the bi-directional pogo pin 42, the antenna contact position 52 and a GPS radio frequency transceiver chip constitute one GPS signal transceiver path; that is, as the embodiment shown in FIG. 5, the smart watch realizes the setting of a Bluetooth antenna and a GPS antenna. As shown in FIG. 6, the metal piece 11, the bi-directional pogo pin 41, the antenna contact position 51 and the wireless communication transceiver chip or chip group (such as Connectivity transceiver chip) constitute the transceiver path of the Bluetooth signal and GPS signal; the metal piece 12, the bi-directional pogo pin 42, the antenna contact position 52, and a cellular mobile communication transceiver chip or chip group (such as a Cellula transceiver chip) constitute a 2G/3G/4G signal transceiver path; that is, as the embodiment shown in FIG. 6, the smart watch realizes the setting of the Bluetooth antenna, the GPS antenna and the 2G/3G/4G antenna at the same time, which further meet the user's needs.

As can be seen, the above-described embodiments illustrate that the technical solution provided by the present invention realizes the setting of a dual-frequency antenna without changing the overall appearance of the smart watch, similarly, the upper watch casing 10 of the smart watch is divided into three or more metal pieces, and each metal piece is connected with the radio frequency transceiver module adapted to thereof via the above-mentioned solution, forming a plurality of the antenna signal transceiver paths supporting different communication bands and/or communication types, which then may realize the design of the multi-frequency antenna.

Figure 7:
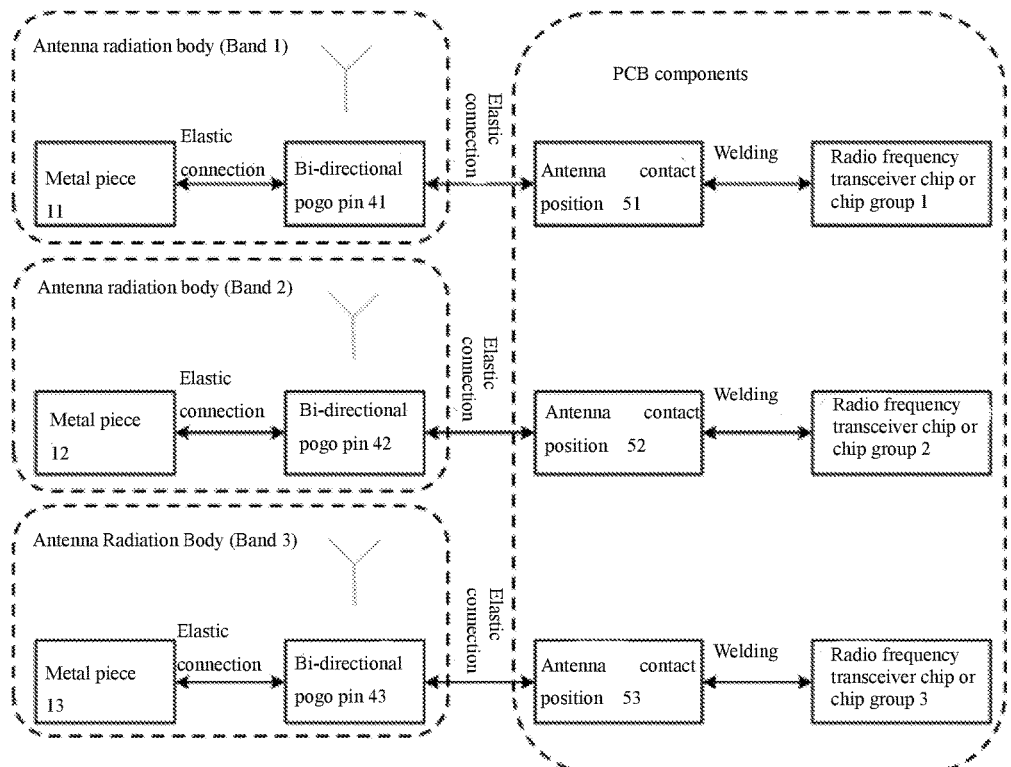
FIG. 7 shows a diagram of an antenna signal transceiver path according to still another embodiment of the present invention.

FIG. 7 shows a diagram of an antenna signal transceiver path according to one embodiment of the present invention, as shown in FIG. 7, the present embodiment realizes three antenna signal transceiver paths that support different communication bands. The metal piece 11, the bi-directional pogo pin 41, the antenna contact position 51 and the radio frequency transceiver chip or chip group 1 constitute a signal transceiver path supporting the communication band 1; the metal piece 12, the bi-directional pogo pin 42, the antenna contact position 52 and the radio frequency transceiver chip or chip group 2 constitute a signal transceiver path supporting the communication band 2; the metal piece 13, the bi-directional pogo pin 43, the antenna contact position 53 and the radio frequency transceiver chip or chip group 3 constitute a signal transceiver path supporting the communication band 3. Wherein the metal piece 11, the metal piece 12, and the metal piece 13 are three metal pieces divided by the metal made upper watch casing 10.

In one embodiment of the present invention, each metal piece may be connected with the communication module on the master chip in the smart watch via other connection components; the other connection devices includes an elastically connected metal piece welded on the PCB or the unidirectional pogo pin welded on the PCB.

To meet the appearance requirements of the electronic apparatus, in one embodiment of the present invention, a plurality of the metal pieces designed according to the present invention may use different metal outer surface treatment methods such as a painting treatment method, a polishing treatment method and so on, and may also use different synthetic metal components such as stainless steel, a metal blended with a proportion of gold, copper and the like.

The electronic apparatus disclosed in the present invention includes, but is not limited to, the smart wrist watch in the above embodiments.

Figure 8:
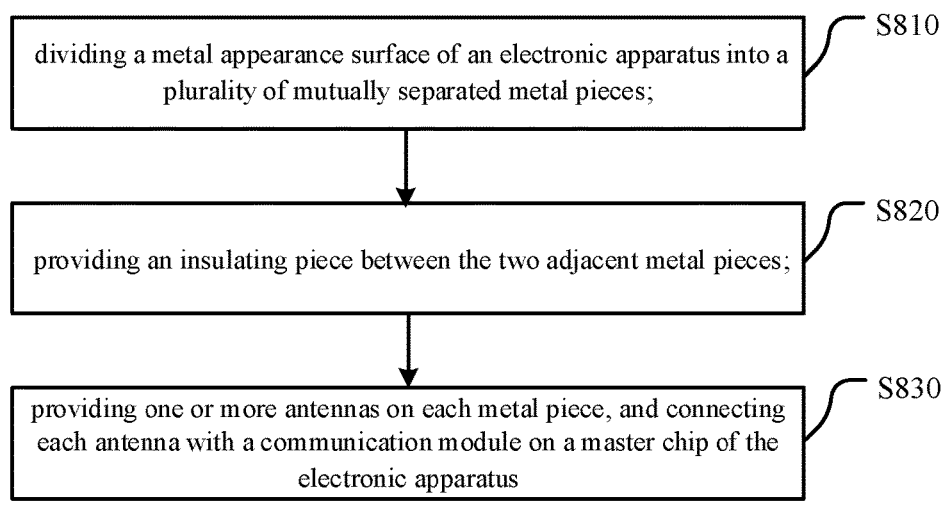
FIG. 8 shows a flow chart of an antenna setting method of an electronic apparatus according to one embodiment of the present invention.

FIG. 8 shows a flow chart of an antenna setting method of an electronic apparatus according to one embodiment of the present invention. As shown in FIG. 8, the method includes:

Step S810, dividing a metal outer surface of the electronic apparatus into a plurality of mutually separated metal pieces;

Step S820, providing an insulating piece between the two adjacent metal pieces;

Step S830, providing one or more antennas on each metal piece, and connecting each antenna with a communication module on a master chip of the electronic apparatus.

In this step, for a plurality of the metal pieces, the antennas provided on the different metal pieces support different communication bands and/or communication types, respectively; the communication module on the master chip of the electronic apparatus includes a plurality of radio frequency transceiver modules, each radio frequency transceiver module supports a communication frequency band and/or a communication type; a plurality of the radio frequency transceiver modules are adapted to the antennas provided on a plurality of the metal pieces, respectively.

In one embodiment of the present invention, the method shown in FIG. 8 further includes: Step S840, mounting and fixing the metal outer surface of the electronic apparatus on a plastic base; when the metal outer surface is mounted on the plastic base, the partitioning plastic piece provided on the plastic base is embedded between the adjacent two metal pieces as the insulating piece. Specifically, the width of the partitioning plastic piece is smaller than a width threshold, and the partitioning plastic piece and the plastic base are made of the same type of injection molding plastic.

In one embodiment of the present invention, the electronic apparatus is a smart watch, the metal made upper watch casing of the smart watch is taken as the metal outer surface of the electronic apparatus; correspondingly, according to Step S810 of the method shown in FIG. 8, dividing the metal outer surface of the electronic apparatus into a plurality of mutually separated metal pieces includes dividing the upper watch casing of the smart watch into two symmetrical metal pieces. Furthermore, the smart watch further includes a watch band, considering the fixing manner and stability of the watch band and a watch body, dividing the upper watch casing of the above smart watch into two symmetrical metal pieces may be: dividing the upper watch casing into two metal pieces which are symmetrical in a direction parallel to a watch spindle; in the embodiment, the method shown in FIG. 8 further includes: assembling the two metal pieces and the two ends of the watch band via the watch spindle. This manner means that the fixed position of the watch spindle is on a complete metal component rather than on different metal components, making it easier to achieve the desired accuracy of the fixing position of the mounted watch spindle.

In one embodiment, the two metal pieces of the upper watch casing of the smart watch are used as two antennas for supporting different communication bands and/or communication types, respectively, the communication module includes two radio frequency transceiver modules, and each radio frequency transceiver module supports a communication frequency band and/or a communication type; two radio frequency transceiver module are adapted to two metal pieces, respectively. Each metal piece is connected with the communication module on the master chip in the smart watch and further connected with the adapted radio frequency transceiver module. The metal piece and the communication module are connected therebetween, two antenna signal transceiver paths are formed in the smart watch, and the smart watch may send and receive signals for different communication bands and/or communication types through the two antenna signal transceiver paths.

The metal pieces and communication modules are connected as follows: each metal piece, through a connection device, is elastically connected with the communication module on the master chip in the smart watch, so that the corresponding antenna is connected with the communication module; the communication module is provided on the Printed Circuit Board (PCB) of the master chip, and the PCB is provided thereon with an antenna contact position; the connection device includes a bi-directional pogo pin, a unidirectional pogo pin and a metal clip; when the connection device is the bi-directional pogo pin, one end of the bi-directional pogo pin is in contact with the metal piece, and the other end of the bi-directional pogo pin is positioned in the antenna contact position; when the connection device is the unidirectional pogo pin or the metal clip, one end of the unidirectional pogo pin or the metal clip is in contact with the metal piece, and the other end of the unidirectional pogo pin or the metal clip is welded in the antenna contact position.

In one embodiment of the present invention, the surfaces of each metal contact portion on a plurality of the metal pieces of the smart watch for achieving the connection with the communication module are all plated with gold; the metal piece is made of different synthetic metal components.

Furthermore, in order to support the communication of more signals on the smart watch, in another embodiment of the present invention, according to Step S810 of the method shown in FIG. 8, dividing the metal outer surface of the electronic apparatus into a plurality of mutually separated metal pieces includes: dividing the upper watch casing 10 of the smart watch into three or more metal pieces. Each metal piece is connected with the radio frequency transceiver module adapted to thereof, forming a plurality of the antenna signal transceiver paths supporting different communication bands and/or communication types, which then may realize the design of the multi-frequency antenna.

The embodiment of the antenna setting method of the electronic apparatus shown in FIG. 8 has been described in details in the foregoing, and will not be described again.

In a summary, the technical proposal provided by the present invention provides a solution for a multi-frequency antenna for an electronic device having a metal outer surface, the solution divides the metal appearance surface of the electronic apparatus having visual completion into a plurality of metal pieces, and directly uses these metal pieces to realize the multi-antenna, effectively utilizing the physical size of the metal piece, solving the contradiction between the antenna body and the metal component in the antenna design in the prior art, thus reducing the design constraints on the metal component, improving the efficiency of the antenna, and making the electronic equipment have more texture and more strength; and since the width of an insulating piece between the metal pieces, the metal appearance surface of the electronic apparatus may maintain an integrated visual effect, the multi-antenna radiator is formed on the basis of the overall appearance of the electronic apparatus without affecting the appearance of the electronic apparatus and the multi-frequency antenna design of the electronic apparatus is conveniently and effectively realized.

The foregoing is merely a preferred embodiment of the present invention and is not intended to limit the protection scope of the present invention. Any modification, equivalent substitution, improvement, and the like made within the spirit and principles of the present invention are intended to be included within the protection scope of the present invention.

The invention claimed is:

1. An electronic apparatus, wherein the electronic apparatus comprises a metal made appearance surface;
   wherein the metal appearance surface consists of a plurality of mutually separated metal pieces;
   an insulating piece is provided between two adjacent metal pieces;
   each metal piece is provided thereon with one or more antennas, and each antenna is connected with a communication module on a master chip of the electronic apparatus;
   wherein the electronic apparatus is a smart watch; and each metal piece, through a connection device, is elastically connected with the communication module on the master chip in the smart watch, so that the corresponding antenna is connected with the communication module;
   the communication module is provided on the Printed Circuit Board (PCB) of the master chip, and the PCB is provided thereon with an antenna contact position;
   the connection device is a bi-directional pogo pin, wherein one end of the bi-directional pogo pin is in contact with the metal piece, and the other end of the bi-directional pogo pin is placed in the antenna contact position.

2. The electronic apparatus according to claim 1, wherein the electronic apparatus further comprises a plastic base for mounting and fixing the metal appearance surface;
   the plastic base is provided thereon with a partitioning plastic piece;
   when the metal appearance surface is mounted on the plastic base, the partitioning plastic piece is embedded between the adjacent two metal pieces as the insulating piece.

3. The electronic apparatus according to claim 2, wherein the width of the partitioning plastic piece is smaller than a width threshold, and the partitioning plastic piece and the plastic base use the same type of injection molding plastic.

4. The electronic apparatus according to claim 1, wherein
   for the a plurality of the metal pieces, the antennas provided on the different metal pieces support different communication bands and/or communication types, respectively;
   the communication module comprises a plurality of radio frequency transceiver modules, and each radio frequency transceiver module supports a communication frequency band and/or a communication type;
   the a plurality of the radio frequency transceiver modules are adapted to the antennas provided on the a plurality of the metal pieces, respectively.

5. The electronic apparatus according to claim 1, wherein the metal appearance surface is a metal made upper watch casing;
   the upper watch casing is divided into two symmetrical metal pieces.

6. The electronic apparatus according to claim 5, wherein the electronic apparatus further comprises a watch band;
   the upper watch casing is divided into two metal pieces which are symmetrical in a direction parallel to a watch spindle;
   the two metal pieces and the two ends of the watch band are assembled by the watch spindle, respectively.

7. The electronic apparatus according to claim 6, wherein the surface of each metal contact portion on the a plurality of the metal pieces for achieving the connection with the communication module is plated with gold;
   the metal piece is made of different synthetic metal components.

8. An antenna setting method for an electronic apparatus, wherein the method comprises:
   dividing a metal appearance surface of the electronic apparatus into a plurality of mutually separated metal pieces;
   providing an insulating piece between two adjacent metal pieces;
   providing one or more antennas on each metal piece, and connecting each antenna with a communication module on a master chip of the electronic apparatus;
   wherein the electronic apparatus is a smart watch, and connecting each antenna on the metal piece with the communication module comprises:
   elastically connecting each metal piece with the communication module on the master chip in the smart watch through a connection device, so that the corresponding antenna is connected with the communication module;
   providing the communication module on the Printed Circuit Board (PCB) of the master chip, and providing the PCB thereon with an antenna contact position;

the connection device comprising at least one of a bi-directional pogo pin, a unidirectional pogo pin and a metal clip;

when the connection device is the bi-directional pogo pin, contacting one end of the bi-directional pogo pin with the metal piece, and positioning the other end of the bi-directional pogo pin in the antenna contact position; when the connection device is the unidirectional pogo pin or the metal clip, contacting one end of the unidirectional pogo pin or the metal clip with the metal piece, and welding the other end of the unidirectional pogo pin or the metal clip in the antenna contact position.

9. The method of claim 8, wherein the method further comprises:

mounting and fixing the metal appearance surface of the electronic apparatus on the plastic base;

providing a partitioning plastic piece on the plastic base;

when the metal appearance surface is mounted on the plastic base, the partitioning plastic piece being embedded between the adjacent two metal pieces as the insulating piece.

10. The method according to claim 8, wherein the method further comprises:

for the a plurality of the metal pieces, setting the antennas provided on the different metal pieces as the antennas supporting different communication bands and/or communication types, respectively;

the communication module comprising a plurality of radio frequency transceiver modules, each radio frequency transceiver module supporting a communication frequency band and/or a communication type;

the a plurality of the radio frequency transceiver modules being adapted to the antennas provided on the a plurality of the metal pieces, respectively.

11. The method according to claim 8, wherein taking the metal made upper watch casing of the smart watch as the metal appearance surface of the electronic apparatus;

dividing the metal appearance surface of the electronic apparatus into a plurality of mutually separated metal pieces comprises dividing the upper watch casing into two symmetrical metal pieces.

12. The method according to claim 11, wherein dividing the upper watch casing into two symmetrical metal pieces comprises dividing the upper watch casing into two metal pieces which are symmetrical in a direction parallel to a watch spindle; and the smart watch further comprises a watch band; and the method further comprises: assembling the two metal pieces and the two ends of the watch band by the watch spindle.

13. The method according to claim 12, wherein the method further comprises:

the surface of each metal contact portion on a plurality of the metal pieces for achieving the connection with the communication module being plated with gold;

the metal piece being made of different synthetic metal components.

14. An electronic apparatus, wherein the electronic apparatus comprises a metal made appearance surface;

wherein the metal appearance surface consists of a plurality of mutually separated metal pieces;

an insulating piece is provided between two adjacent metal pieces;

each metal piece is provided thereon with one or more antennas, and each antenna is connected with a communication module on a master chip of the electronic apparatus;

wherein the electronic apparatus is a smart watch; and each metal piece, through a connection device, is elastically connected with the communication module on the master chip in the smart watch, so that the corresponding antenna is connected with the communication module;

the communication module is provided on the Printed Circuit Board (PCB) of the master chip, and the PCB is provided thereon with an antenna contact position;

the connection device is a unidirectional pogo pin or a metal clip, wherein one end of the unidirectional pogo pin or the metal clip is in contact with the metal piece, and the other end of the unidirectional pogo pin or the metal clip is welded in the antenna contact position.

* * * * *